US011378160B2

(12) United States Patent
Tetsuka et al.

(10) Patent No.: US 11,378,160 B2
(45) Date of Patent: Jul. 5, 2022

(54) LONG OBJECT GUIDING DEVICE AND PARTITION MEMBER

(71) Applicant: TSUBAKIMOTO CHAIN CO., Osaka (JP)

(72) Inventors: Takayuki Tetsuka, Osaka (JP); Tamaki Shiki, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 792 days.

(21) Appl. No.: 16/330,543

(22) PCT Filed: Sep. 22, 2017

(86) PCT No.: PCT/JP2017/034386
§ 371 (c)(1),
(2) Date: Mar. 5, 2019

(87) PCT Pub. No.: WO2018/062055
PCT Pub. Date: Apr. 5, 2018

(65) Prior Publication Data
US 2021/0285517 A1    Sep. 16, 2021

(30) Foreign Application Priority Data

Sep. 27, 2016 (JP) .............................. JP2016-188650

(51) Int. Cl.
| F16G 13/16 | (2006.01) |
| H02G 11/00 | (2006.01) |
| H02G 3/04 | (2006.01) |

(52) U.S. Cl.
CPC ........... *F16G 13/16* (2013.01); *H02G 3/0406* (2013.01); *H02G 11/00* (2013.01)

(58) Field of Classification Search
CPC ....... F16G 13/16; H02G 3/0406; H02G 11/00
(Continued)

(56) References Cited

U.S. PATENT DOCUMENTS

| 5,220,779 A * | 6/1993 | Tatsuta ................. H02G 11/006 59/900 |
| 6,992,254 B2 * | 1/2006 | Komiya ............... H02G 11/006 248/51 |

(Continued)

FOREIGN PATENT DOCUMENTS

| DE | 102006027246 A1 | 12/2007 |
| JP | 50-148592 U | 12/1975 |

(Continued)

OTHER PUBLICATIONS

International Search Report dated Dec. 12, 2017, issued in counterpart International Application No. PCT/JP2017/034386 (1 page).

(Continued)

*Primary Examiner* — Timothy J Thompson
*Assistant Examiner* — Michael F McAllister
(74) *Attorney, Agent, or Firm* — WHDA, LLP

(57) ABSTRACT

An elongated object guiding device includes links arranged in series. Adjacent ones of the links are pivotally coupled to each other. An accommodation chamber is defined in the links. Each link includes an inner recess, an inner projection, an outer recess, and an outer projection that limit a pivoting range of the link and an adjacent link so that the links are pivoted between a straight state and a bent state. Each link includes a separating member that separates elongated objects accommodated in the accommodation chamber from each other. Each separating member is pivotally coupled to an adjacent separating member. Each separating member includes a through-hole and a sliding portion that limit a pivoting range of the separating member and an adjacent separating member so that a limit on a first side of the pivoting range is the straight state.

3 Claims, 5 Drawing Sheets

(58) Field of Classification Search
USPC .......................................................... 59/78.1
See application file for complete search history.

(56) References Cited

U.S. PATENT DOCUMENTS

| | | | | |
|---|---|---|---|---|
| 7,591,128 | B2* | 9/2009 | Komiya | ............ F16G 13/16 |
| | | | | 59/900 |
| 10,018,249 | B2* | 7/2018 | Komiya | ............ H02G 11/00 |
| 2001/0025715 | A1 | 10/2001 | Muller et al. | |
| 2013/0025252 | A1 | 1/2013 | Harada | |

FOREIGN PATENT DOCUMENTS

| | | |
|---|---|---|
| JP | 2011-247329 A | 12/2011 |
| JP | 2015-220790 A | 12/2015 |
| TW | 453008 B | 9/2001 |
| TW | 201307703 A | 2/2013 |
| WO | 2016/171725 A1 | 10/2016 |

OTHER PUBLICATIONS

Office Action dated Nov. 18, 2021, issued in counterpart DE Application No. 11 2017 004 844.3. (7 pages).

* cited by examiner

LONG OBJECT GUIDING DEVICE AND PARTITION MEMBER

BACKGROUND OF THE INVENTION

The present invention relates to an elongated object device that guides elongated objects, such as flexible cables or hoses that supply power or liquid to a movable unit incorporated in a machine tool or the like while protecting the elongated object when the movable unit moves with the elongated object accommodated and relates to a separating member that is incorporated in the elongated object guiding device and separates the accommodated elongated objects from each other.

Patent document 1 describes an example of such an elongated object guiding device. The elongated object guiding device includes links that are pivotally coupled to one another. The elongated object guiding device includes an accommodation space that is defined in the links and accommodates an elongated object. Each link includes a separation plate that separates the elongated objects accommodated in the accommodation space from each other.

The elongated object guiding device is used with its one end coupled to a movable body that moves back and forth in a serial direction and its the other end fixed to a fixed portion. The elongated object guiding device guides the elongated object accommodated in the accommodation space while protecting the elongated object when the movable body moves back and forth. In this case, the elongated object guiding device is arranged so that a curved portion is formed at an intermediate part of the elongated object guiding device in the longitudinal direction. The curved portion moves in the serial direction when the movable body moves back and forth.

PRIOR ART DOCUMENT

Patent Document

Patent Document 1: Japanese Laid-Open Patent Publication No. 2011-247329

SUMMARY OF THE INVENTION

When the above-described elongated object guiding device is used, load is concentrated in each link. Thus, each link is likely to be worn. When the wear of each link causes a straight part of the elongated object guiding device located between the curved portion and the movable body to droop due to the weight of the straight part, the elongated object guiding device will not be able to be used. That is, the lifetime of the elongated object guiding device is determined by how worn each link is. Thus, there is room for improvement in the lengthening of the lifetime.

It is an object of the present invention to provide an elongated object guiding device and a separating member capable of lengthening the lifetime.

The means for solving the above problem and the advantages of the present invention will now be described.

An elongated object guiding device that solves the above-described problem includes links arranged in series. Adjacent ones of the links are pivotally coupled to each other. The elongated object guiding device also includes an accommodation chamber that is defined in the links and accommodates an elongated object. Each link includes a link limiting portion that limits a pivoting range of the link and an adjacent link so that the links are pivoted between a straight state in which the links are arranged straight and a bent state in which the links are bent and a separating member that separates elongated objects accommodated in the accommodation chamber from each other. Each separating member is pivotally coupled to an adjacent separating member. Each separating member includes a separation limiting portion that limits a pivoting range of the separating member and an adjacent separating member so that a limit on a first side of the pivoting range is the straight state.

With this structure, when the links are kept in the straight state by limiting the pivoting range with the link limiting portion, the separation limiting portion restricts pivoting of the separating members so as to keep the straight state. That is, the load on the link limiting portion of each link in the straight state is shared by the separation limiting portion of each separating member. This reduces the load on each link in the straight state and thus reduces the wear of each link, thereby lengthening the lifetime of the elongated object guiding device.

In the above-described elongated object guiding device, it is preferred that the separation limiting portion of each separating member limit a pivoting range of the separating member and an adjacent separating member so that a limit on a second side of the pivoting range is the bent state.

With this structure, when the links are kept in the bent state by limiting the pivoting range with the link limiting portion, the separation limiting portion restricts pivoting of the separating members so as to keep the bent state. That is, the load on the link limiting portion of each link in the bent state is shared by the separation limiting portion of each separating member. This reduces the load on each link in the bent state and thus further reduces the wear of each link, thereby further lengthening the lifetime of the elongated object guiding device.

In the above-described elongated object guiding device, it is preferred that each separating member include a first end and a second end in a coupling direction of the links. It is also preferred that the separation limiting portion of each separating member include a first engagement portion formed at the first end of the separating member and a second engagement portion formed at the second end of the separating member. It is also preferred that the first engagement portion of one of two adjacent ones of the separating members and the second engagement portion of the other one of the two adjacent ones of the separating members engage with each other in a first mode in which pivoting of the two adjacent ones of the separating members toward the first side is restricted when in the straight state. It is also preferred that the first engagement portion of one of two adjacent ones of the separating members and the second engagement portion of the other one of the two adjacent ones of the separating members engage with each other in a second mode in which pivoting of the two adjacent ones of the separating members toward the second side is restricted when in the bent state.

With this structure, the first engagement portion of one of the two adjacent ones of the separating members engages with the second engagement portion of the other one of the separating members in the first mode and the second mode. Thus, when two adjacent ones of the links are kept in the straight state and the bent state, the load on the links can be reduced.

In the above-described elongated object guiding device, it is preferred that the separation limiting portion of each separating member include a guide. It is also preferred that when adjacent ones of the links are pivoted between the straight state and the bent state, the guides of adjacent ones of the separating members corresponding to the adjacent ones of the links guide the first engagement portion of one of the adjacent ones of the separating members and the second engagement portion of the other one of the adjacent ones of the separating members so that an engaged state of the first engagement portion with the second engagement portion is switched between the first mode and the second mode.

With this structure, the guide allows the engaged state of the first engagement portion of one of two adjacent ones of the separating members with the second engagement portion of the other one of the separating members to be smoothly switched between the first mode and the second mode.

A separating member that solves the above-described problem is a separating member incorporated in the above-described elongated object guiding device. The separating member is coupled to a corresponding one of the links in a removable manner.

With this structure, the same advantages as the above-described elongated object guiding device can be gained. In addition, the separating member can be solely replaced.

The present invention is capable of lengthening the lifetime of an elongated object guiding device.

DETAILED DESCRIPTION OF THE PREFERRED EMBODIMENTS

An elongated object guiding device according to an embodiment will now be described.

Figure 1:
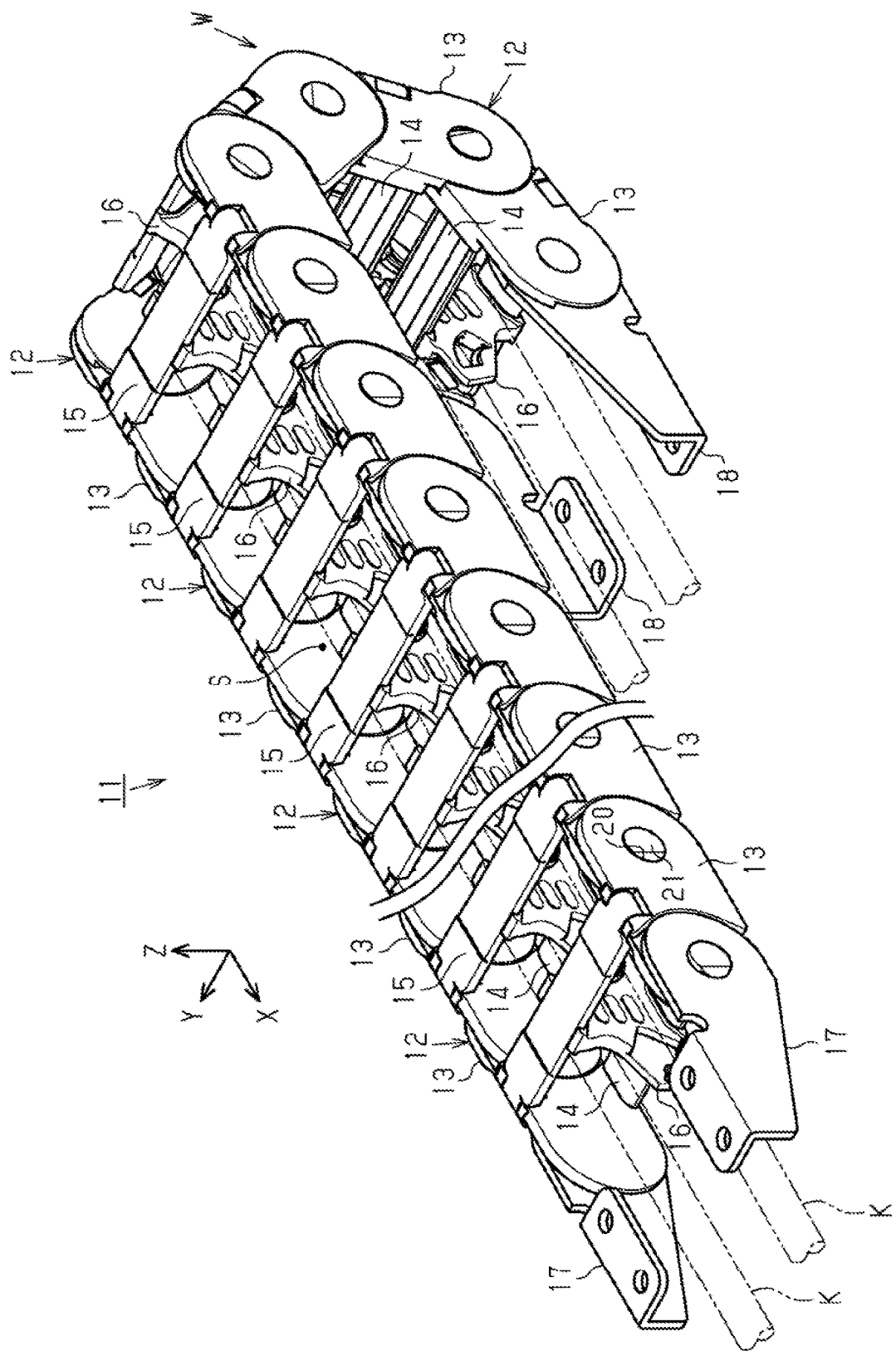
FIG. 1 is a perspective view showing an elongated object guiding device according to an embodiment.

Referring to FIG. 1, an elongated object guiding device 11 is made of a synthetic plastic and includes links 12 arranged in series. Adjacent ones of the links 12 are pivotally coupled to each other. Thus, the longitudinal direction of the elongated object guiding device 11 coincides with a coupling direction X in which the links 12 are coupled to one another.

Each link 12 includes two substantially rectangular link plates 13 opposed to each other in a width direction Y, a substantially rectangular first coupling portion 14 that couples the two link plates 13 to each other, and a substantially rectangular second coupling portion 15 that couples the two link plates 13 to each other at a position opposed to the first coupling portion 14. The width direction Y corresponds to a direction that is orthogonal to the coupling direction X. In the present embodiment, the first coupling portion 14 is integrated with the two link plates 13. The second coupling portion 15 is coupled to the two link plates 13 in a removable manner. The first coupling portion 14 may be coupled to the two link plates 13 in a removable manner.

The space surrounded by pairs of link plates 13, first coupling portions 14, and second coupling portions 15 of the links 12 to extend in the coupling direction X defines an accommodation chamber S. The accommodation chamber S is configured to accommodate elongated objects K that can be bent in a flexible manner. That is, the elongated object guiding device 11 accommodates the elongated objects K in the accommodation chamber S, which is defined in the links 12 by serially coupling the links 12 to one another.

Figure 2:
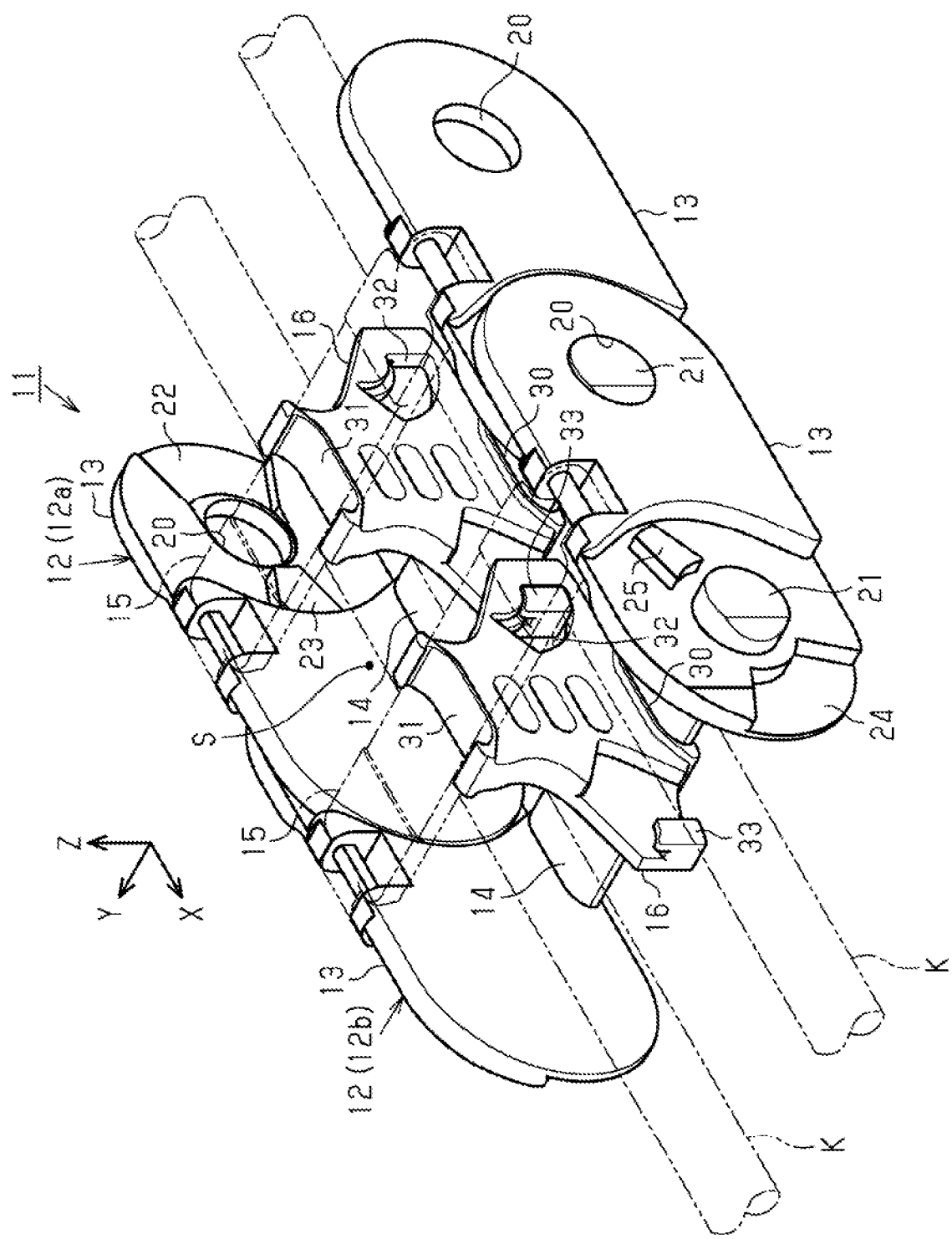
FIG. 2 is a perspective view showing part of the elongated object guiding device and links when arranged in a straight state.

As shown in FIGS. 1 and 2, each link 12 includes a separating member 16 that separates the elongated objects K accommodated in the accommodation chamber S from each other. The separating member 16 has the form of a substantially triangular plate and is coupled to each link 12 in a removable manner so as to split the accommodation chamber S in the width direction Y. In this case, the separating member 16 is coupled to the first coupling portion 14 and the second coupling portion 15 of each link 12 so as to couple the first coupling portion 14 and the second coupling portion 15 to each other.

Two brackets 18 are pivotally coupled to a link 12 of the links 12 located at a first end in the coupling direction X. Two coupling brackets 17 are pivotally coupled to a link 12 of the links 12 located at a second end in the coupling direction X. A movable body (not shown) that moves back and forth in the coupling direction X is coupled to the two coupling brackets 17. A fixed part (not shown) is coupled to the two brackets 18. The elongated object guiding device 11 guides the elongated objects K accommodated in the accommodation space S while protecting the elongated objects K when the link 12 of the links 12 located at the second end moves, that is, when the movable body (not shown) moves back and forth.

In this case, the elongated object guiding device 11 is arranged so that a curved portion W is formed at an intermediate part of the elongated object guiding device 11 in the coupling direction X. The curved portion W moves back and forth along the coupling direction X when the link 12 of the links 12 located at the second end moves back and forth along the coupling direction X, that is, when the movable body (not shown) moves back and forth. Examples of the elongated objects K accommodated in the accommodation chamber S include an electrical cable or an optical fiber cable that supplies power to the movable body (not shown) and transmits a signal to the movable body (not shown), a hose that supplies gas (for example, air) or liquid (for example, water or oil) to the movable body (not shown), and an elongated multi-joint member that is bendable in a flexible manner.

Figure 3:
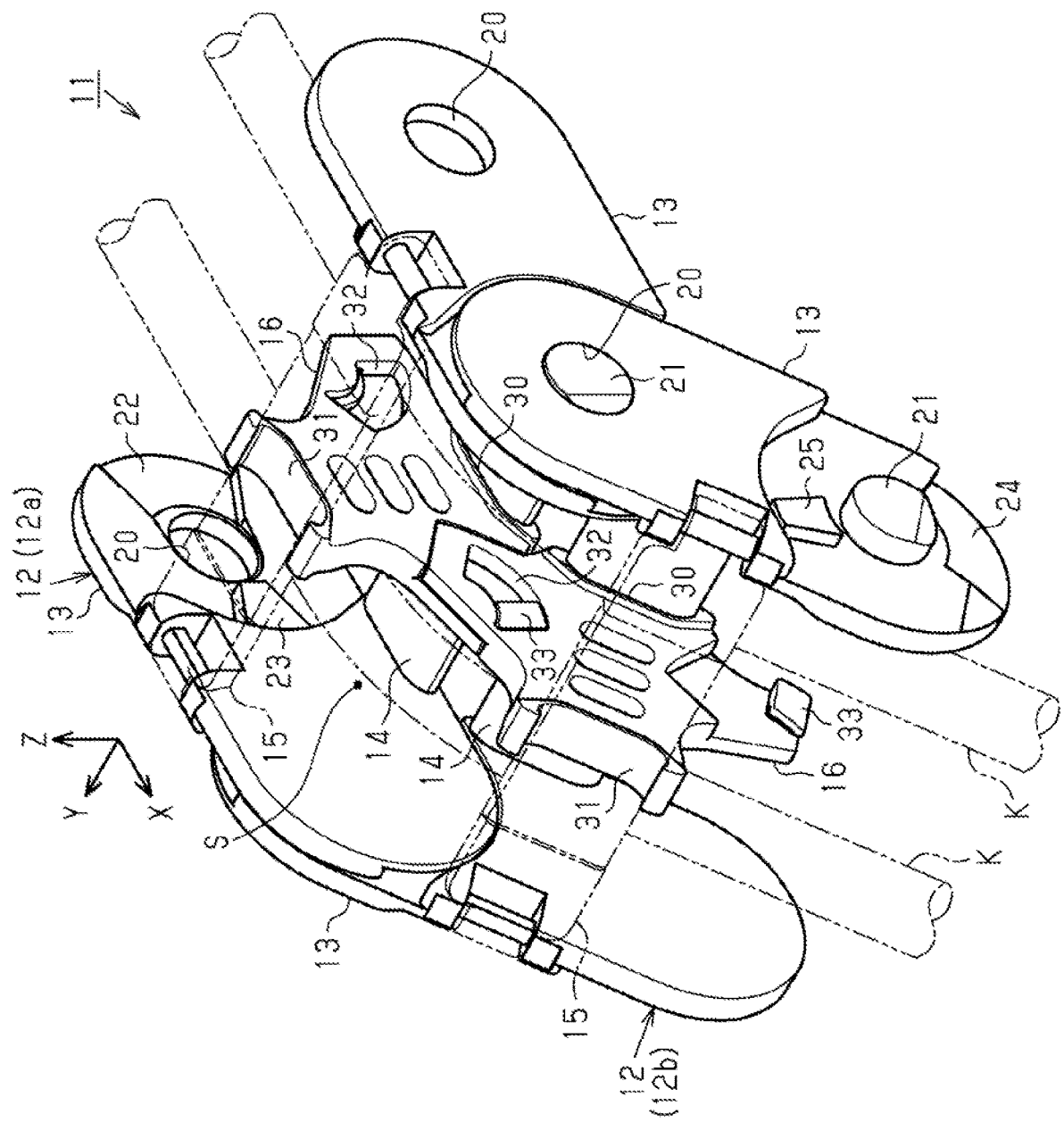
FIG. 3 is a perspective view showing part of the elongated object guiding device and links when arranged in a bent state.

As shown in FIGS. 2 and 3, each link plate 13 has a substantially rectangular shape with two rounded ends (first and second ends) in the coupling direction X. The first end of each link plate 13 in the coupling direction X has a circular coupling hole 20 extending through the first end. The outer surface of the second end of each link plate 13 includes a circular coupling projection 21 that is pivotally fitted to the coupling hole 20 of its adjacent link plate 13 in the coupling direction X.

The inner surface of each link plate 13 includes a substantially sectoral inner recess 22 and a substantially cuboid inner projection 23. On the inner surface of each link plate 13, the inner recess 22 is formed at the first end in the coupling direction X where the coupling hole 20 is formed. On the inner surface of each link plate 13, the inner projection 23 is formed at a position where the coupling hole 20 is located between the inner recess 22 and the inner projection 23 in the coupling direction X. The outer surface of each link plate 13 includes a substantially sectoral outer recess 24 and a substantially cuboid outer projection 25. On the outer surface of each link plate 13, the outer recess 24 is formed at the second end in the coupling direction X where the coupling projection 21 is formed. On the outer surface of each link plate 13, the outer projection 25 is formed at a position where the coupling projection 21 is located between the outer recess 24 and the outer projection 25 in the coupling direction X.

As shown in FIGS. 2 and 3, when two links 12 adjacent to each other in the coupling direction X are referred to as a first link 12a and a second link 12b, the coupling projections 21 of the two link plates 13 of the first link 12a are fitted into the coupling holes 20 of the two link plates 13 of the second link 12b. The outer projections 25 of the link plates 13 of the first link 12a are accommodated in the inner recesses 22 of the link plates 13 of the second link 12b. The inner projections 23 of the link plates 13 of the second link 12b are accommodated in the outer recesses 24 of the link plates 13 of the first link 12a. The inner projections 23 and the outer projections 25 are respectively slidable in the outer recesses 24 and the inner recesses 22 within a predetermined angular range (for example, by 45 degrees) along the circumferential direction of the coupling hole 20. Thus, the predetermined angular range is the pivoting range of the links 12 adjacent to each other in the coupling direction X (pivotable angular range).

More specifically, the inner projection 23 and the outer projection 25 are slidable (pivotable) only within the range of the lengths of the outer recess 24 and the inner recess 22 along the circumferential direction of the coupling hole 20. In other words, the inner projection 23 is slidable (pivotable) only within a range from a state in which the outer surface of the inner projection 23 on a first side is in abutment with the inner surface of the outer recess 24 on the first side to a state in which the outer surface of the inner projection 23 on a second side is in abutment with the inner surface of the outer recess 24 on the second side. In the same manner, the outer projection 25 is slidable (pivotable) only within a range from a state in which the outer surface of the outer projection 25 on the first side is in abutment with the inner surface of the inner recess 22 on the first side to a state in which the outer surface of the outer projection 25 on the second side is in abutment with the inner surface of the inner recess 22 on the second side.

In this case, the inner recess 22, the inner projection 23, the outer recess 24, and the outer projection 25 of each link 12 limit the pivoting range of the link 12 and its adjacent link 12 so that the links 12 are pivoted between a straight state (state shown in FIG. 2) in which the links 12 are arranged straight and a bent state (state shown in FIG. 3) in which the links 12 are bent. Thus, in the present embodiment, the inner recess 22, the inner projection 23, the outer recess 24, and the outer projection 25 configure a link limiting portion.

The structure of the separating member 16 will now be described in detail.

Figure 4:
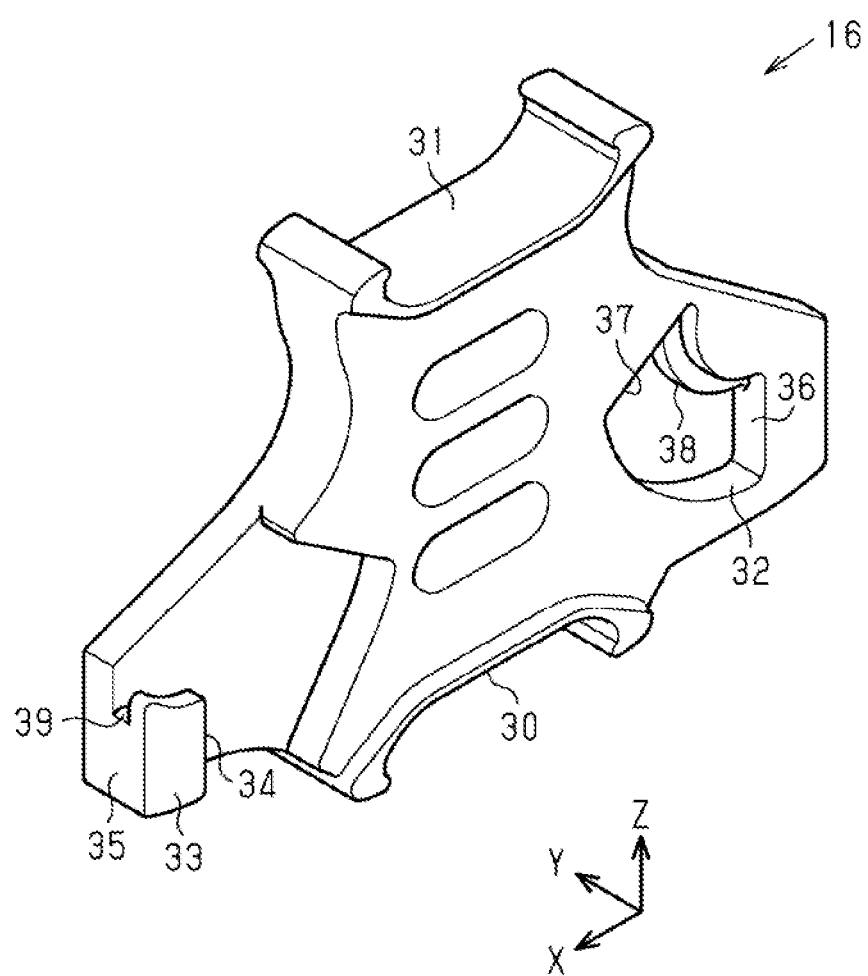
FIG. 4 is a perspective view showing a separating member.

As shown in FIGS. 2 and 4, the separating member 16 includes a substantially U-shaped first fitting portion 30 arranged at the first end in a height direction Z and a substantially U-shaped second fitting portion 31 arranged at the second end in the height direction Z. The first fitting portion 30 is formed so as to be fitted to the first coupling portion 14 in a removable manner. The second fitting portion 31 is formed so as to be fitted to the second coupling portion 15 in a removable manner. The height direction Z corresponds to a direction that is orthogonal to both the coupling direction X and the width direction Y.

More specifically, the first fitting portion 30 and the second fitting portion 31 are respectively fitted to the first coupling portion 14 and the second coupling portion 15 so as to be held from the opposite sides in the coupling direction X in a removable manner. The position of the separating member 16 coupled to the links 12 (the position where the accommodation chamber S is split) in the width direction Y can be changed by changing the positions of the first fitting portion 30 and the second fitting portion 31 respectively fitted to the first coupling portion 14 and the second coupling portion 15 in the width direction Y.

Figure 5:
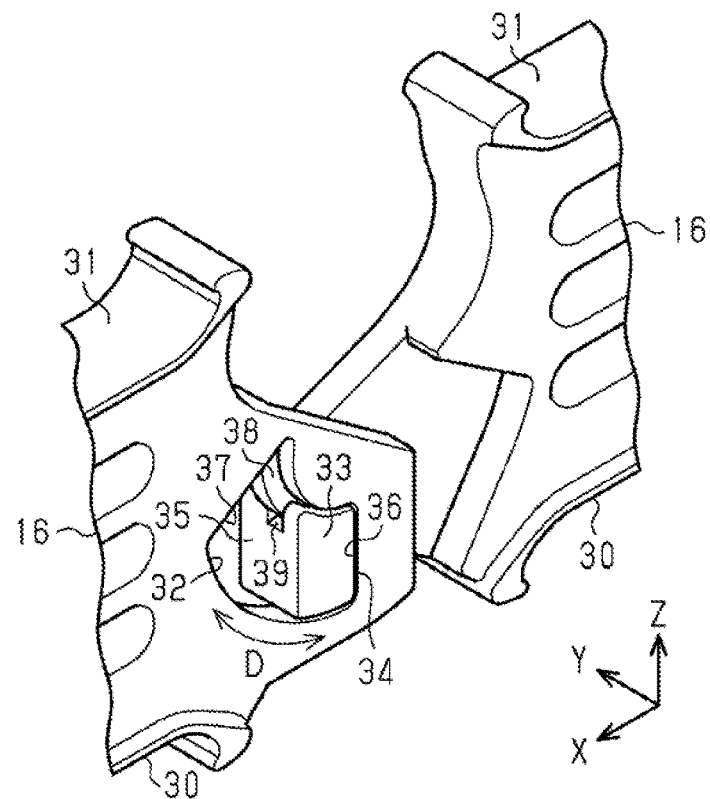
FIG. 5 is a perspective view showing coupled separating members in the straight state.

As shown in FIGS. 4 and 5, the separating member 16 includes a substantially sectoral through-hole 32 serving as a first engagement portion and a substantially block-shaped sliding portion 33 serving as a second engagement portion. The through-hole 32 extends through the separating member 16 along the width direction Y at the first end of the separating member 16 in the coupling direction X. The sliding portion 33 protrudes along the width direction Y from the second end of the separating member 16 in the coupling direction X.

The sliding portion 33 of one of the two separating members 16 adjacent in the coupling direction X is inserted into the through-hole 32 of the other one of the two separating members 16 along the width direction Y. In this case, the sliding portion 33 is inserted into the through-hole 32 in a relatively slidable manner as the adjacent links 12 are pivoted. That is, the two separating members 16 adjacent in the coupling direction X are pivotally coupled to each other as the links 12 corresponding to the separating members 16 are pivoted. When the direction in which the through-hole 32 slides relative to the sliding portion 33 is referred to as a sliding direction D, the surface of the sliding portion 33 on the first side in the sliding direction D defines a first outer surface 34. The surface of the sliding portion 33 on the second side in the sliding direction D defines a second outer surface 35. In the sliding direction D, the through-hole 32 slides relative to the sliding portion 33. The surface of the through-hole 32 on the first side in the sliding direction D defines a first wall surface 36. The surface of the through-hole 32 on the second side in the sliding direction D defines a second wall surface 37.

As shown in FIGS. 2 and 5, when the two links 12 adjacent in the coupling direction X are arranged in the straight state, the first wall surface 36 of the through-hole 32 of one of the two separating members 16 corresponding to the two links 12 is in contact with the first outer surface 34 of the sliding portion 33 of the other one of the two separating members 16. This state is referred to as a first mode. In the first mode, pivoting of the separating members 16 toward the first side (toward the second coupling portion 15) is restricted.

Figure 6:
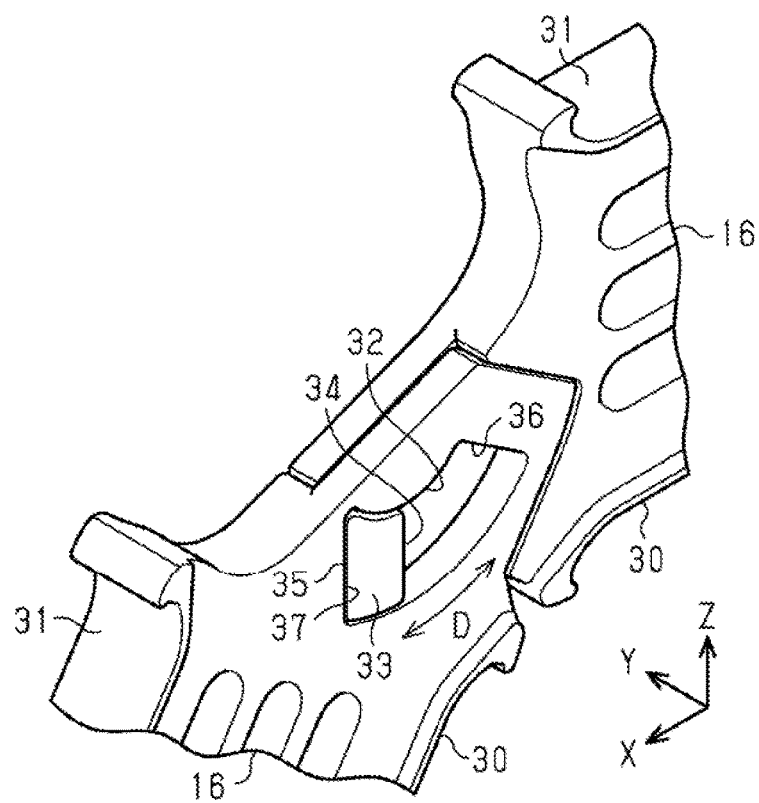
FIG. 6 is a perspective view showing coupled separating members in the bent state.

As shown in FIGS. 3 and 6, when the two links 12 adjacent in the coupling direction X are arranged in the bent state, the second wall surface 37 of the through-hole 32 of one of the two separating members 16 corresponding to the two links 12 is in contact with the second outer surface 35 of the sliding portion 33 of the other one of the two separating members 16. This state is referred to as a second mode. In the second mode, pivoting of the separating members 16 toward the second side (toward the first coupling portion 14) is restricted.

More specifically, when the two links 12 corresponding to the two separating members 16 adjacent in the coupling direction X are arranged in the straight state, the through-hole 32 of one of the two separating members 16 engages with the sliding portion 33 of the other one of the two separating members 16 in the first mode, in which pivoting of the separating members 16 toward the first side (toward the second coupling portion 15) is restricted. Further, when the two links 12 corresponding to the two separating members 16 adjacent in the coupling direction X are arranged in the bent state, the through-hole 32 of one of the two separating members 16 engages with the sliding portion 33 of the other one of the two separating members 16 in the second mode, in which pivoting of the separating members 16 toward the second side (toward the first coupling portion 14) is restricted.

Thus, in the present embodiment, the through-hole 32 and the sliding portion 33 configure a separation limiting portion that limits the pivoting range of the separating members 16 adjacent in the coupling direction x so that the limit on the first side (side of the second coupling portion 15) of the pivoting range of the separating members 16 is the straight state of the links 12 corresponding to the separating members 16. Further, in the present embodiment, the separation limiting portion, which includes the through-hole 32 and the sliding portion 33, is configured to limit the pivoting range of the separating members 16 adjacent in the coupling direction X so that the limit on the second side (side of the first coupling portion 14) of the pivoting range of the separating members 16 is the bent state of the links 12 corresponding to the separating members 16.

As shown in FIGS. 5 and 6, the inner surface of the through-hole 32 of each separating member 16 includes a protrusion 38 extending from the first wall surface 36 to the second wall surface 37 along the sliding direction D. The sliding portion 33 of each separating member 16 includes an engagement groove 39 that engages with the protrusion 38, which is arranged on the inner surface of the through-hole 32 of its adjacent separating member 16, in a relatively slidable manner.

The protrusion 38 on the inner surface of the through-hole 32 of one of two adjacent separating members 16 engages with the engagement groove 39 of the sliding portion 33 of the other one of the separating members 16. Thus, when the two adjacent links 12 corresponding to the two separating members 16 are pivoted between the straight state and the bent state, the through-hole 32 of one of the two separating members 16 and the sliding portion 33 of the other one of the separating members 16 are guided so that the engaged state of the through-hole 32 with the sliding portion 33 is switched between the first mode and the second mode.

More specifically, the engagement of the protrusion 38 and the engagement groove 39 causes the through-hole 32 of one of two adjacent separating members 16 and the sliding portion 33 of the other one of the separating members 16 to be guided so that the through-hole 32 and the sliding portion 33 slide relative to each other between the first mode and the second mode while being restricted from moving along the width direction Y. Thus, in the present embodiment, the protrusion 38 and the engagement groove 39 configure a guide.

The operation of the elongated object guiding device 11 during use will now be described.

When the links 12 connected to the movable body (not shown) move back and forth in the coupling direction X together with the movable body, the elongated object guiding device 11 moves back and forth in the coupling direction X so that the curved portion W moves in accordance with the movable body (not shown). This allows the elongated object guiding device 11 to guide the elongated objects K accommodated in the accommodation chamber S while protecting the elongated objects K when the movable body (not shown) moves. Then, in the elongated object guiding device 11, two links 12 adjacent in the coupling direction X are repeatedly pivoted between the straight state and the bent state as the curved portion W moves back and forth.

When the adjacent links 12 are kept in the straight state by limiting the pivoting range with the inner recess 22, the inner projection 23, the outer recess 24, and the outer projection 25, which configure the link limiting portion, the through-hole 32 and the sliding portion 33, which configure the separation limiting portion, restrict pivoting of the separating members 16 so that the straight state is kept. That is, when the adjacent links 12 are kept in the straight state, the two separating members 16 corresponding to the two links 12 engage with each other in the first mode, in which the first wall surface 36 of the through-hole 32 of one of the two separating members 16 is in abutment (contact) with the first outer surface 34 of the sliding portion 33 of the other one of the separating members 16.

When the adjacent links 12 are kept in the bent state by limiting the pivoting range with the inner recess 22, the inner projection 23, the outer recess 24, and the outer projection 25, which configure the link limiting portion, the through-hole 32 and the sliding portion 33, which configure the separation limiting portion, restrict pivoting of the separating members 16 so that the bent state is kept. That is, when the adjacent links 12 are kept in the bent state, the two separating members 16 corresponding to the two links 12 engage with each other in the second mode, in which the second wall surface 37 of the through-hole 32 of one of the two separating members 16 is in abutment (contact) with the second outer surface 35 of the sliding portion 33 of the other one of the separating members 16.

Thus, in each of the straight state and the bent state, the load on the inner recess 22, the inner projection 23, the outer recess 24, and the outer projection 25, which configure the link limiting portion of each link 12, is shared by the through-hole 32 and the sliding portion 33, which configure the separation limiting portion of each separating member 16. This reduces the load on the inner recess 22, the inner projection 23, the outer recess 24, and the outer projection 25, which configure the link limiting portion of each link 12, in the straight state and the bent state. This reduces the wear of the link limiting portion of each link 12, that is, the wear of the inner recess 22, the inner projection 23, the outer recess 24, and the outer projection 25. Thus, the lifetime of the elongated object guiding device 11 is lengthened.

The embodiment described above in detail has the following advantages.

(1) In the elongated object guiding device 11, each separating member 16 is pivotally coupled to its adjacent separating member 16. Further, each separating member 16 includes the through-hole 32 and the sliding portion 33. The through-hole 32 and the sliding portion 33 of each separating member 16 configure the separation limiting portion, which limits the pivoting range of the separating member 16 and its adjacent separating member 16 so that the limit on the first side (side of the second coupling portion 15) of the pivoting range is the straight state. Thus, when the adjacent links 12 are kept in the straight state by limiting the pivoting range with the inner recess 22, the inner projection 23, the outer recess 24, and the outer projection 25, which configure the link limiting portion, the through-hole 32 and the sliding portion 33, which configure the separation limiting portion, restrict pivoting of the separating members 16 so as to help keep the straight state. That is, the load on the inner recess 22, the inner projection 23, the outer recess 24, and the outer projection 25 of each link 12 in the straight state is shared by the through-hole 32 and the sliding portion 33 of each separating member 16. This reduces the load on each link 12 in the straight state and thus reduces the wear of each link 12, thereby lengthening the lifetime of the elongated object guiding device 11. Additionally, in the elongated object guiding device 11, when the straight part between the curved portion W and the movable body (not shown) is kept substantially flat, the load of the straight part applied to the inner recess 22, the inner projection 23, the outer recess 24, and the outer projection 25 of each link 12 is shared by the through-hole 32 and the sliding portion 33 of each separating member 16. This allows the elongated object guiding device 11 to have a longer stroke. That is, the distance in which the movable body (not shown) is moved back and forth when the elongated object guiding device 11 is used, i.e., the maximum length of the straight part of the elongated object guiding device 11 between the curved portion W and the movable body (not shown), can be lengthened.

(2) In the elongated object guiding device 11, the through-hole 32 and the sliding portion 33 of each separating member 16 limit the pivoting range of the separating member 16 and its adjacent separating member 16 so that the limit on the second side (side of the first coupling portion 14) of the pivoting range is the bent state. Thus, when the adjacent links 12 are kept in the bent state by limiting the pivoting range with the inner recess 22, the inner projection 23, the outer recess 24, and the outer projection 25, the through-hole 32 and the sliding portion 33 restrict pivoting of the separating members 16 so as to help keep the bent state. That is, the load on the inner recess 22, the inner projection 23, the outer recess 24, and the outer projection 25 of each link 12 in the bent state is shared by the through-hole 32 and the sliding portion 33 of each separating member 16. This reduces the load on each link 12 in the bent state and thus further reduces the wear of each link 12, thereby further lengthening the lifetime of the elongated object guiding device 11.

(3) In the elongated object guiding device 11, the through-hole 32 of one of two adjacent separating members 16 engages with the sliding portion 33 of the other one of the separating members 16 in the first mode, in which pivoting of the separating members 16 toward the first side (toward second coupling portion 15) is restricted in the straight state. In addition, the through-hole 32 of one of two adjacent separating members 16 engages with the sliding portion 33 of the other one of the separating members 16 in the second mode, in which pivoting of the separating members 16 toward the second side (toward first coupling portion 14) is restricted in the bent state. Thus, when two adjacent links 12 are kept in the straight state and the bent state, the load on the links 12 can be reduced through engagement of the through-hole 32 of one of two adjacent separating members 16 with the sliding portion 33 of the other one of the separating members 16 in the first mode and the second mode.

(4) In the elongated object guiding device 11, the through-hole 32 and the sliding portion 33 of the separating member 16 include the protrusion 38 and the engagement groove 39, which guide the through-hole 32 and the sliding portion 33 so that the engaged state of the through-hole 32 with the sliding portion 33 is switched between the first mode and the second mode when adjacent links 12 are pivoted between the straight state and the bent state. Thus, the protrusion 38 and the engagement groove 39 allow the engaged state of the through-hole 32 of one of two adjacent separating members 16 with the sliding portion 33 of the other one of the separating members 16 to be smoothly switched between the first mode and the second mode.

(5) In the elongated object guiding device 11, the separating member 16 is coupled to each link 12 in a removable manner. Thus, the separating member 16 can be solely replaced easily.

(6) In the elongated object guiding device 11, the separating member 16 coupled to each link 12 in a removable manner engages with its adjacent separating member 16 at the through-hole 32 and the sliding portion 33. Thus, when the elongated object guiding device 11 is assembled, the coupling positions in the width direction Y of the separating members 16 adjacent in the coupling direction X can be easily aligned. This increases the efficiency for coupling the separating member 16 to the link 12 and consequently increases the efficiency for assembling the elongated object guiding device 11.

Modifications

The above-described embodiment may be modified as follows.

The separating member 16 does not necessarily have to be coupled to each link 12 in a removable manner.

In the separating member 16, the protrusion 38 and the engagement groove 39 may be omitted.

The through-hole 32 of one of the two separating members 16 adjacent in the coupling direction X and the sliding portion 33 of the other one of the two separating members 16 do not necessarily have to be engaged with each other constantly. For example, the through-hole 32 of one of the two separating members 16 adjacent in the coupling direction X and the sliding portion 33 of the other one of the two separating members 16 may be engaged with each other only in the first mode and the second mode (straight state and bent state).

The through-hole 32 and the sliding portion 33 of the separating member 16 do not necessarily have to limit the pivoting range of the adjacent separating members 16 so that the limit on the second side (side of the first coupling portion 14) is the bent state. For example, the through-hole 32 and the sliding portion 33 of the separating member 16 may be configured so that the bent state is followed by the limit on the second side (side of the first coupling portion 14) of the pivoting range of the adjacent separating members 16.

DESCRIPTION OF REFERENCE CHARACTERS 11) elongated object guiding device; 12) link; 16) separating member; 22) inner recess configuring link limiting portion; 23) inner projection configuring link limiting portion; 24) outer recess configuring link limiting portion; 25) outer projection configuring link limiting portion; 32) through-hole that serves as first engagement portion configuring separation restriction portion; 33) sliding portion that serves as second engagement portion configuring separation restriction portion; 38) protrusion configuring guide; 39) engagement groove configuring guide; K) elongated object; S) accommodation chamber

The invention claimed is:
1. An elongated object guiding device comprising:
   links arranged in series, wherein adjacent ones of the links are pivotally coupled to each other; and
   an accommodation chamber that is defined in the links and accommodates an elongated object, wherein
   each link includes
      a link limiting portion that limits a pivoting range of the link and an adjacent link so that the links are pivoted between a straight state in which the links are arranged straight and a bent state in which the links are bent, and a separating member that separates elongated objects accommodated in the accommodation chamber from each other, each separating member is pivotally coupled to an adjacent separating member, each separating member includes a separation limiting portion, the separation limiting portion of each separating member limits a pivoting range of the separating member and an adjacent separating member so that a limit on a first side of the pivoting range is the straight state, the separation limiting portion of each separating member limits a pivoting range of the separating member and an adjacent separating member so that a limit on a second side of the pivoting range is the bent state, each separating member includes a first end and a second end in a coupling direction of the links, the separation limiting portion of each separating member includes a first engagement portion formed at the first end of the separating member and a second engagement portion formed at the second end of the separating member, the first engagement portion of one of two adjacent ones of the separating members and the second engagement portion of the other one of the two adjacent ones of the separating members engage with each other in a first mode in which pivoting of the two adjacent ones of the separating members toward the first side is restricted when in the straight state, and the first engagement portion of one of two adjacent ones of the separating members and the second engagement portion of the other one of the two adjacent ones of the separating members engage with each other in a second mode in which pivoting of the two adjacent ones of the separating members toward the second side is restricted when in the bent state.

2. The elongated object guiding device according to claim 1, wherein the separation limiting portion of each separating member includes a guide, and when adjacent ones of the links are pivoted between the straight state and the bent state, the guides of adjacent ones of the separating members corresponding to the adjacent ones of the links guide the first engagement portion of one of adjacent ones of the separating members and the second engagement portion of the other one of the adjacent ones of the separating members so that an engaged state of the first engagement portion with the second engagement portion is switched between the first mode and the second mode.

3. A separating member incorporated in the elongated object guiding device according to claim 1, wherein the separating member is coupled to a corresponding one of the links in a removable manner.

* * * * *